United States Patent [19]

Sheets

[11] Patent Number: 4,615,483
[45] Date of Patent: Oct. 7, 1986

[54] WARM AIR DIVERTER FOR VEHICLES

[76] Inventor: Kerney T. Sheets, P.O. Box 771, Duplessis, La. 70728

[21] Appl. No.: 731,986

[22] Filed: May 8, 1985

[51] Int. Cl.$^4$ ............................................. B60H 1/02
[52] U.S. Cl. .............................. 237/12.3 A; 123/41.65
[58] Field of Search .................... 237/12.3 A, 12.3 B; 98/2, 2.05, 2.08; 123/41.65, 41.04

[56] References Cited

U.S. PATENT DOCUMENTS

| | | | |
|---|---|---|---|
| 2,584,329 | 4/1947 | Clapper | 180/54 |
| 2,920,829 | 8/1956 | Swane | 237/12.3 |
| 3,155,318 | 1/1963 | Kirkham | 237/12.3 |
| 4,093,119 | 5/1977 | Swisher | 237/12.3 |
| 4,252,271 | 6/1979 | Green | 237/12.3 |

Primary Examiner—Henry Bennett
Attorney, Agent, or Firm—David L. Ray

[57] ABSTRACT

A warm air deflector which is connectable to the outside of the radiator housing of a vehicle in which air is blown in a forward direction over the radiator and out the front of radiator. It includes a curved front plate generally located on the upper half of the radiator and extending above the top of the radiator. The curved plate is generally concave with the concave portion facing toward the driver. Connected to each side of the curved plate are two parallel side walls having their inner edges generally parallel to the radiator of the vehicle and their outer edges terminating along the edge of the curved plate, the curved plate having a series of holes on the lower portion thereof and a slidable baffle for selectively covering the holes. The slidable baffle may be lowered to divert air into the diverter and back onto the operator or raised to allow air to flow through the radiator and through the holes in the curved plate without being diverted backward onto the driver.

16 Claims, 6 Drawing Figures

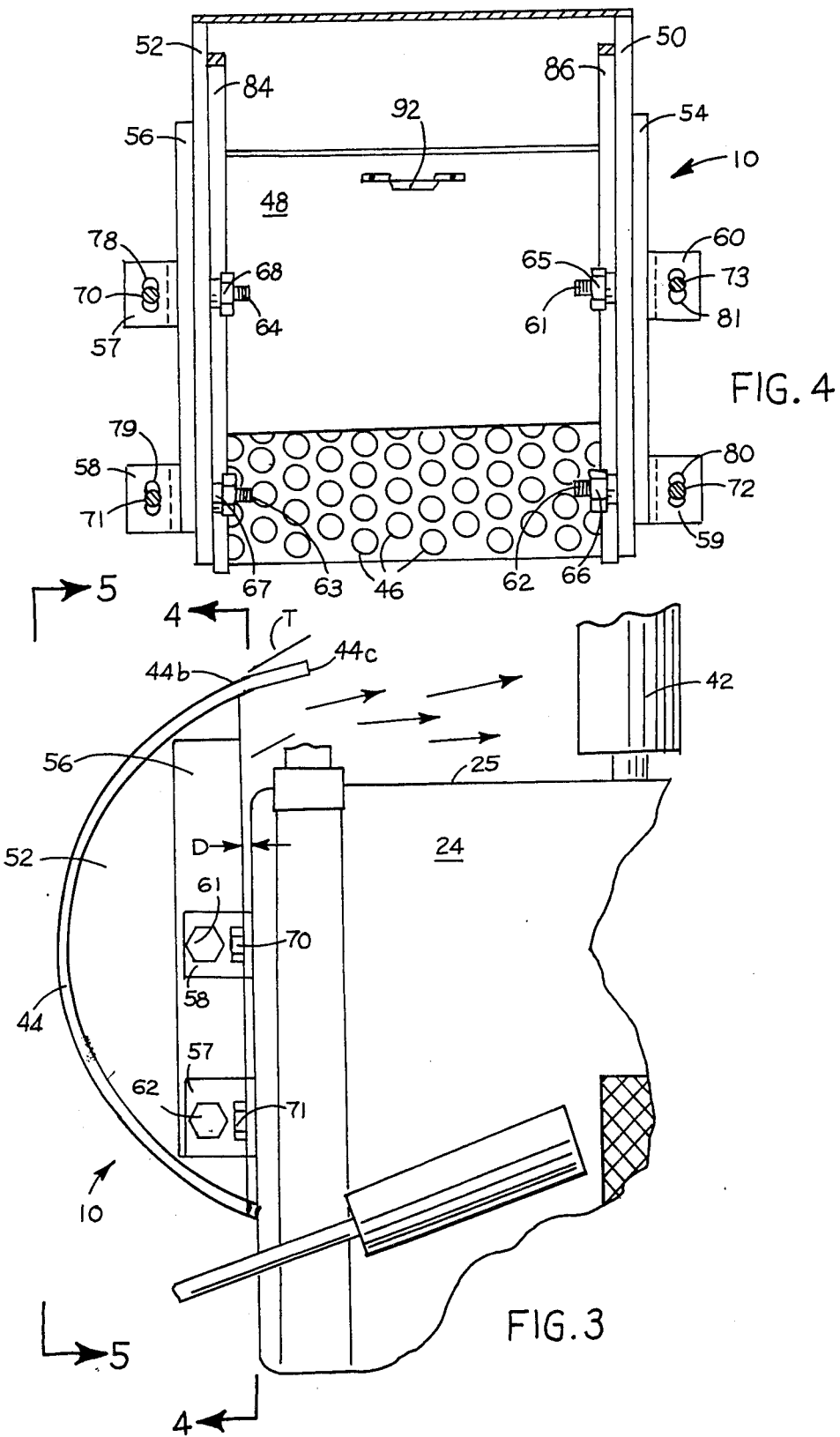

WARM AIR DIVERTER FOR VEHICLES

BACKGROUND OF THE INVENTION

1. Field of the Invention

The present invention is related to vehicle heaters. In particular the present invention is related to an apparatus for diverting the air blown over a vehicle radiator onto the operator of the vehicle to warm the operator.

2. Brief Description of the Prior Art

Many large vehicles such as bulldozers and similar equipment have open cabs which are unheated. The operator of such vehicles is commonly rendered very uncomfortable when operating the vehicle in cold weather. In many large vehicles such as bulldozers the air blown over the radiator is directed toward the front of the vehicle and out through the radiator. Such flow is desirable during operation of the vehicle in warm weather to avoid heating the operator unduly. However, when cold weather is encountered, it is desirable to divert warm air onto the operator to keep the operator comfortable. It is common for operators operating such vehicles as bulldozers in cold weather to stop the bulldozer and stand in front of the bulldozer to warm up. Such actions lower the productivity of the operator and the bulldozer significantly.

Various devices for diverting warm air onto the driver are known in the art. Patents pertinent to such devices are U.S. Pat. Nos. 2,584,329; 2,920,829; 3,155,318; 4,093,119; and 4,252,271.

U.S. Pat. No. 2,584,329 for hot-air deflector for tractors discloses a hood which attaches to the sides and top of the tractor to divert air directed backwardly onto the engine and the driver. The hot-air deflector does not attach to the grill of the tractor.

U.S. Pat. No. 3,920,829 discloses an elongated hood which is formed of a rectangular panel and a pair of side flaps and which is fitted over the radiator of the tractor and the front of the radiator to divert air from the radiator onto the driver. A conduit is attached to the hood to convey the warm air backwardly from the hood onto the driver.

U.S. Pat. No. 3,155,318 discloses an accessory heating system for tractors and similar equipment including a radiator engaging cap formed of flexible and resilient material having an intake opening surrounded by a rim of resiliently expanding material and a flexible duct extending from a flexible cap to the point of heat utilization in the area in which the driver is seated.

U.S. Pat. No. 4,093,119 discloses an accessory heating device for tractors and similar equipment comprising a heater housing mounted onto a forward wall of the radiator housing of the tractor, the heater housing having a plurality of vane elements disposed transversely across the opening in the front wall wherein each vane element can be opened or closed to allow cool air into the chamber. An annularly-shaped sleeve is fixed onto the upper surface of the top around the hole. One end of a flexible conduit is mounted on the sleeve and the other end of the conduit is joined in a fluid serial connection to an air register in the operator's compartment of the tractor.

U.S. Pat. No. 4,252,271 discloses a heavy equipment heating system in which a hood is mounted over the outer end of the vehicle radiator for receiving the cooling air blown through the radiator and directing it in the reverse direction toward the operator; a distribution hood having manually controlled and indexible distribution flaps on the discharge and a manually controlled and indexed shut-off valve on its intake for receiving heated air and distributing it to the operator's head, body and feet selectively with one of the flaps being transparent to permit viewing through it of the instrument panel, and a flexible conduit extending between the hood outlet and the distribution housing inlet and overlying the vehicle engine.

SUMMARY OF THE INVENTION

In accordance with the present invention there is provided a warm air deflector which is connectable to the outside of the radiator housing of a vehicle in which air is blown in a forward direction over the radiator and out the front of radiator. It includes a curved front plate generally located on the upper half of the radiator and extending above the top of the radiator. The curved plate is generally concave with the concave portion facing toward the driver. Connected to each side of the curved plate are two parallel side walls having their inner edges generally parallel to the radiator of the vehicle and their outer edges terminating along the edge of the curved plate, the curved plate having a series of holes on the lower portion thereof and a slidable baffle for selectively covering the holes. The slidable baffle may be lowered to divert air into the diverter and back onto the operator or raised to allow air to flow through the radiator and through the holes in the curved plate without being diverted backward onto the driver.

The present invention has many advantages over warm air diverters and heating devices known in the prior art. The deflector of the invention is compact and easy to attach to the grill located in front of many vehicles such as bulldozers and the like. The diverter of the invention is easy to construct and is low in cost. The diverter has no continuously moving parts, the only moving part being a baffle which may be selectively moved to vary the amount of air flow diverted onto the driver.

When preferably made of rigid metal such as steel the diverter of the present invention has further utility in acting as a protective guard for the vehicle radiator. Such a guard is very important on bulldozers and other machines which are used to clear land of large trees which may strike the radiator guard of the vehicle and cause damage to the guard and the radiator.

The warm air diverter of the present invention requires no lengthy ducts or conduits to convey air from the radiator backward to the operator of the vehicle. The diverter of the present invention can be permanently connected to the vehicle and need not be removed when operating the vehicle in warm or hot weather.

The diverter of the present invention, which is constructed preferable of steel, is very strong and is not easily damaged or torn.

The diverter of the present invention is easy to operate and does not require any specialized knowledge or complex controls.

BRIEF DESCRIPTION OF THE DRAWINGS

The above advantages and other features of the invention will be apparent during the course of the following description of the preferred embodiments and by reference to the following drawings in which:

FIG. 3 is a partly cutaway side elevational view of the diverter of the present invention connected to a bulldozer;

FIG. 4 is a cross-sectional view taken along lines 4—4 of FIG. 3;

DESCRIPTION OF THE PREFERRED EMBODIMENTS

Figure 1:
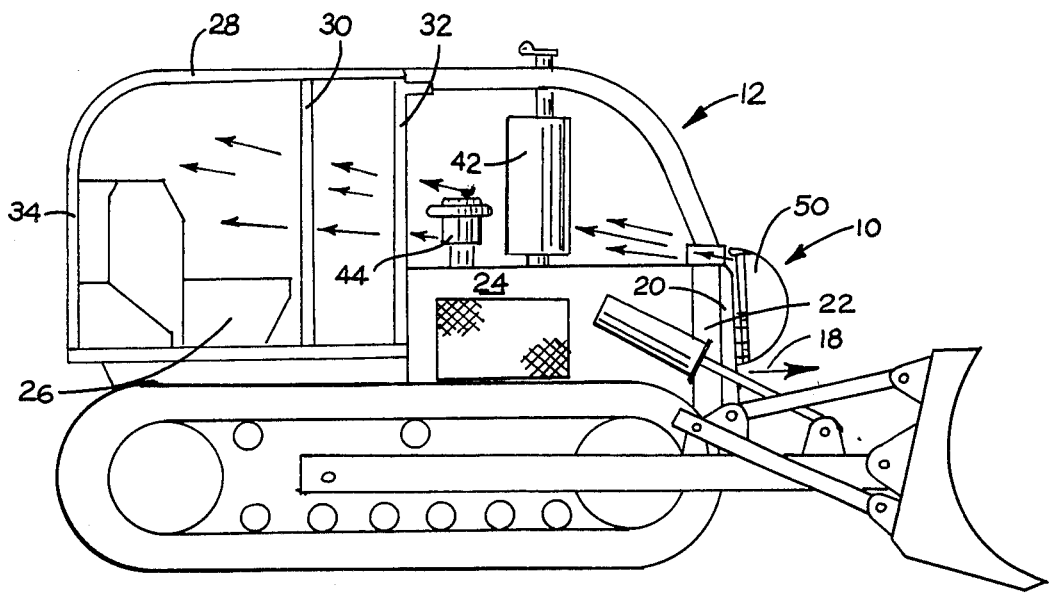
FIG. 1 is a side elevational view of a bulldozer having the diverter of the present invention connected thereto.
Figure 2:
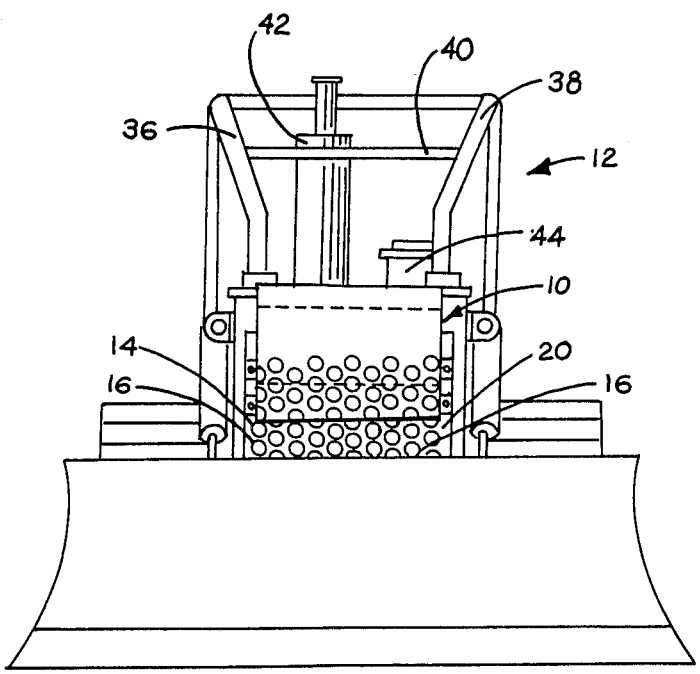
FIG. 2 is a front elevational view of a bulldozer having the diverter of the present invention connected thereto.
Figure 5:
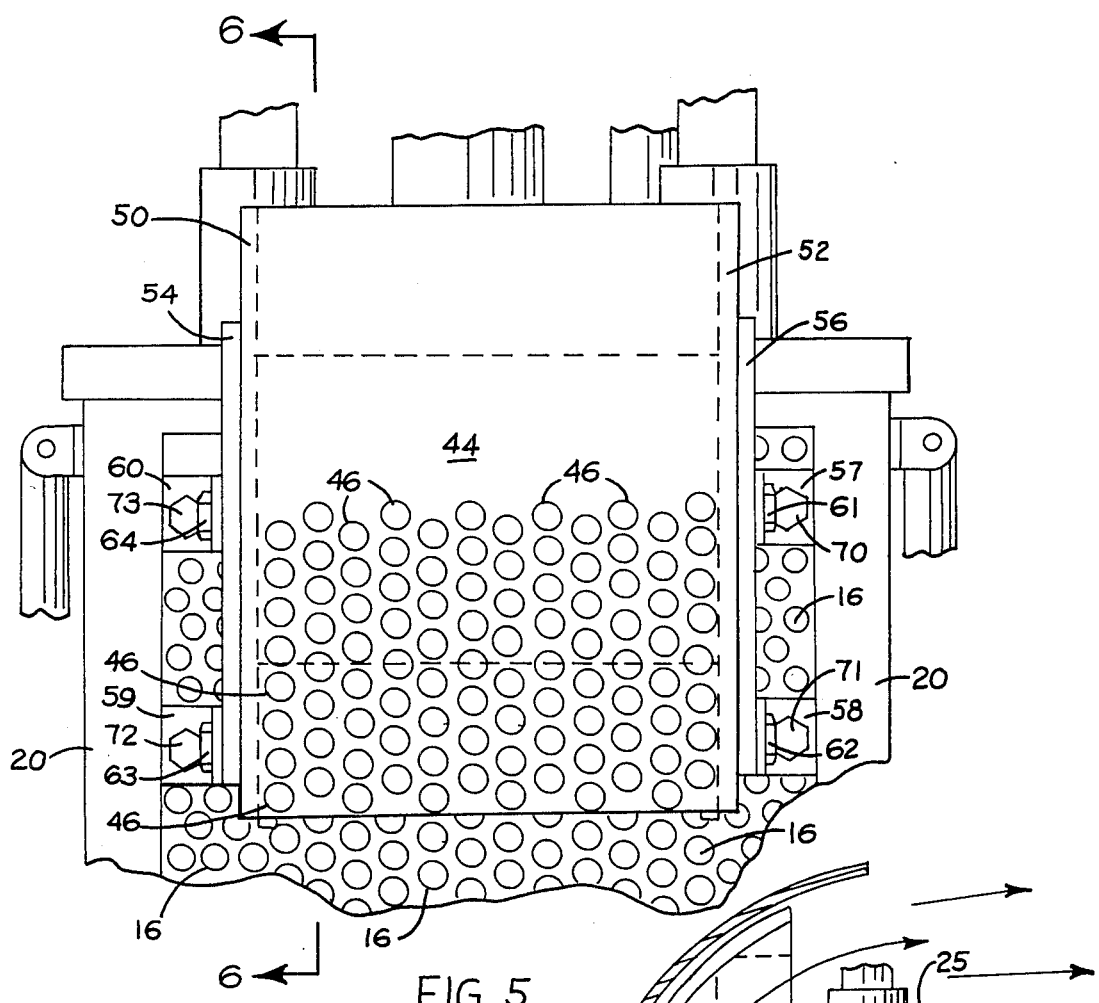
FIG. 5 is a cross-sectional view taken along lines 5—5 of FIG. 3.

Referring now to the drawings, the diverter of the present invention is generally indicated by the number 10. The diverter 10 is shown in FIGS. 1 and 2 to be connected to a bulldozer generally indicated by the numeral 12. Bulldozer 12 has a radiator (not shown) located immediately behind a radiator grill 14 which serves as a guard for the radiator to prevent small sticks or other objects from damaging the radiator. Radiator grill 14 has a series of holes 16 therein to permit air to flow over the radiator and outwardly through the radiator grill 14 as indicated by the arrow 18. Grill 14 is connected to a surrounding grill frame 20 which is commonly connected to cowl 22 by hinges (not shown) or by bolts (not shown). The bulldozer or vehicle engine is located inside of engine hood 24.

The operator of the bulldozer or other vehicle sits upon seat 26 and has a roof 28 over his head to prevent rain from falling on the operator. Roof 28 is connected to bars 30, 32, and 34. On some vehicles the roof 28 is deleted as are bars 30, 32, and 34. Thus the operator is commonly exposed to ambient temperatures and is so exposed on the vehicle shown in FIG. 1 and FIG. 2. Additional bars 36, 38, and 40 shown in FIG. 2 may be provided to protect the operator and the bulldozer from falling limbs or other debris.

Commonly an engine muffler 42 and an engine air cleaner 44 are connected to the top of hood 24. The location of the muffler 42 and the air cleaner 44 may vary according to the particular vehicle on which the diverter 10 is connected.

Referring now to FIGS. 3-6, diverter 10 has an outer curved plate 44 having a series of holes 46 therein through which air can flow unless the holes are covered by baffle 48. Connected to each side of outer curved plate 44 are identical side plates 50 and 52. Side plates 50 and 52 are preferably connected to outer curved plate 44 by welding when the diverter of the present invention is made from the preferred material which is steel. However, if the diverter were made from a plastic material such as a thermoplastic or thermosetting polymer exemplified by polyvinyl chloride, polystyrene and the like, plates 50 and 52 could be injection molded as one integral piece with outer curved plate 44.

Connected to side plates 50 and 52 are reinforcing plates 54 and 56. Reinforcing plates 54 and 56 are preferred to give additional strength to diverter 10 but they may be deleted if desired.

Four L-shaped brackets 57, 58, 59 and 60 are connected to side plates 50 and 52 and reinforcing plates 54 and 56 by bolts 61-64 and nuts 65-68. To attach the diverter of the present invention to the radiator grill of a vehicle such as a bulldozer, L-shaped brackets are connected to the grill of the vehicle by bolts 70-73 having nuts 74-77 connected thereto.

As can be seen in FIG. 4, L-shaped brackets 57-60 preferably have elongated slots 78-81 therein for receipt of bolts 70-73. The elongated slots 78-81 permit bolts 70-73 to be adjusted upwardly and downwardly to align with holes 16 and radiator 14.

Thus it can be seen that the diverter 10 can be easily attached to the grill of a radiator on a vehicle such as a bulldozer by inserting bolts 70-73 through the holes in the radiator grill and connecting nuts 74-77 thereto. Most radiator grills swing outwardly onto hinges aligned vertically down one vertical side wall of the radiator. Such radiator grills can be swung open, the diverter can be attached thereto and the grill can be closed, the entire process taking only a few minutes.

Figure 6:
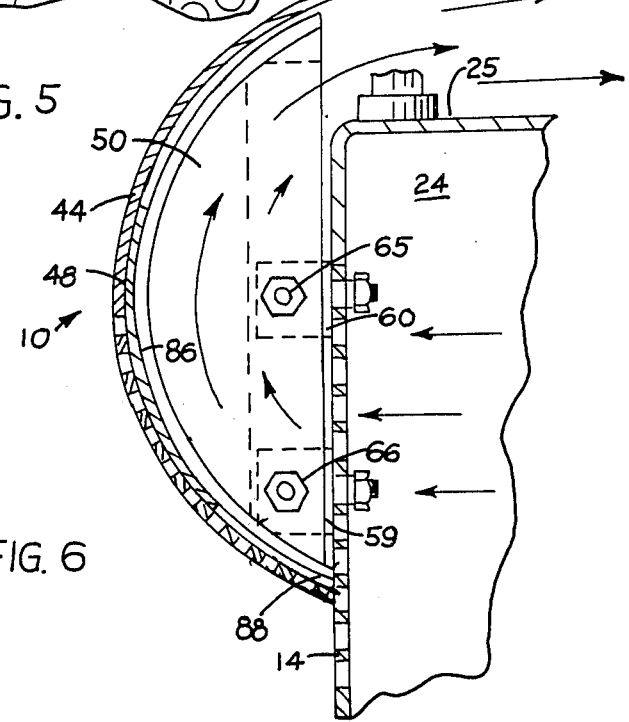
FIG. 6 is a cross-sectional view taken along lines 6—6 of FIG. 5.

Referring now to FIG. 4 and FIG. 6, two tracks 84 and 86 are connected to side plates 52 and 50 respectively for slidable receiving baffle 48. Tracks 84 and 86 are preferably connected at their bottoms 88 to curved plate 44. Baffle 48 preferably has a handle 92 thereon for raising and lowering the baffle.

Curved plate 44 is preferably an arc of a circle from point 44a to point 44b shown in FIG. 3. Preferably, the circle, of which a portion of curved plate 44 is an arc, has a radius of from 17 inches to 22 inches, and more preferably, from 18 inches to 20 inches.

To achieve proper air flow, it is important that point 44b extend above the top 25 of hood 24 from about 4 inches to about 8 inches. Furthermore, from point 44b on curved plate 44 to point 44c, which is preferably a distance from about three inches to five inches, end 44c should be bent downwardly from the tangent (T) to curved plate 44 a distance of from one to two inches. Preferably, the distance from point 44b to end 44c is about four inches and end 44c is moved downwardly from the tangent T a distance of about one inch.

In order to achieve optimum air flow, the diverter 10 should be connected at a distance D shown in FIG. 3 from the surface of radiator grill 14. Distance D is preferably from about 0.5 inches to 2 inches, more preferably from about 0.75 inches to 1.25 inches, and most preferably about one inch.

Although the preferred embodiments of the present invention have been disclosed in detail above, it should be understood that the invention is in no sense limited thereby, and its scope is to be determined by that of the following claims.

What is claimed is:

1. A warm air deflector connectable to the outside of the radiator grill of a vehicle in which air is blown in a forward direction over the radiator and out the front of the radiator, consisting essentially of:
   a. curved front plate means connectable to the outside of the radiator and extending over the top of the radiator, said curved plate means being generally concave, the concave side of said curved plate means facing toward the driver,
   b. two generally parallel sidewalls connected to the sides of said curved plate means at approximate right angles with said curved plate means, the outer edges of said parallel side walls terminating along the edges of said curved plate,
   c. a series of holes located on the lower portion of said curved plate, and
   d. slidable baffle means slidably connected to said curved plate means for selectively covering all of a portion of said holes said baffle comprising a curved cover for said series of holes.

2. The apparatus of claim 1 wherein said curved plate means is located on the upper half of said radiator.

3. The apparatus of claim 2 wherein said curved plate means extends above the top of said radiator.

4. The apparatus of claim 3 wherein said upper portion of said curved plate is a continuous piece of rigid, curved material.

5. The apparatus of claim 4 wherein said holes are located on the lower portion of said curved plate.

6. The apparatus of claim 5 wherein said curved plate has track means located on the inside thereof for receipt of said sliding baffle means.

7. The apparatus of claim 6 wherein said baffle means has a handle connected thereto for sliding said baffle means upwardly and downwardly on the inside of said curved plate means.

8. The apparatus of claim 7 wherein said curved plate means has means attached thereto for connecting said curved plate means to the radiator grill of a vehicle radiator.

9. The apparatus of claim 8 wherein said curved plate means extends above the top of said radiator a distance sufficient to direct air backwardly on to the operator of the vehicle.

10. The apparatus of claim 9 wherein the top of said curved plate means extends at least four inches above the top of said radiator grill.

11. The apparatus of claim 10 wherein the top of said curved plate means extends from about four to about eight inches above the top of said radiator grill.

12. The apparatus of claim 9 wherein the edge of said curved plate means is an arc of a circle having a radius of 17 to 22 inches.

13. The apparatus of claim 12 wherein the upper end of said arc is a straight line bent downwardly from said arc a distance of one to two inches.

14. The apparatus of claim 13 wherein said deflector is connected at a distance from said radiator grill of from about 0.5 to about two inches.

15. A warm air deflector connectable to the outside of the radiator grill of a vehicle having the radiator located in the front of the vehicle in which air is blown in a forward direction over the radiator and out the front of the radiator, the driver's seat being located behind the radiator, comprising:

a. a curved front plate connectable to the outside of the radiator and extending over the top of the radiator a distance sufficient to direct air backwardly on to the operator the vehicle, said curved plate being generally concave, the concave side of said curved plate facing toward the driver's seat, said upper portion of said curved plate being a continuous piece of rigid, curved material, said curved plate being located on the upper half of said radiator, said curved plate having two tracks located on the inside thereof for receipt of a sliding baffle, said curved plate having means attached thereto for connecting said curved plate to the radiator grill of a vehicle radiator, b. two generally parallel sidewalls connected to the sides of said curved plate means at approximate right angles with said curved plate the outer edges of said parallel side walls terminating along the edges of said curved plate, c. a series of holes located on the lower portion of said curved plate, and d. slidable baffle slidably connected to said curved plate for selectively covering all or a portion of said holes, said baffle comprising a curved cover for said series of holes.

16. The apparatus of claim 15 wherein said baffle means has a handle connected thereto for sliding said baffle means upwardly and downwardly on the inside of said curved plate means.

* * * * *